(12) United States Patent
Takahashi et al.

(10) Patent No.: US 11,867,938 B2
(45) Date of Patent: Jan. 9, 2024

(54) POLARIZING PLATE HAVING OUTERMOST LAYER OF ANTI-REFLECTION LAYER RECESSED TOWARDS SUBSTRATE

(71) Applicant: DEXERIALS CORPORATION, Tokyo (JP)

(72) Inventors: Hiroyuki Takahashi, Tokyo (JP); Tomu Takeda, Tome (JP)

(73) Assignee: DEXERIALS CORPORATION, Tochigi (JP)

( * ) Notice: Subject to any disclaimer, the term of this patent is extended or adjusted under 35 U.S.C. 154(b) by 348 days.

(21) Appl. No.: 17/248,326

(22) Filed: Jan. 20, 2021

(65) Prior Publication Data
US 2021/0231853 A1    Jul. 29, 2021

(30) Foreign Application Priority Data
Jan. 29, 2020 (JP) .................. 2020-012625

(51) Int. Cl.
*C03C 17/34* (2006.01)
*C03C 17/36* (2006.01)
(Continued)

(52) U.S. Cl.
CPC ........ *G02B 5/3058* (2013.01); *C03C 17/3417* (2013.01); *G02B 1/11* (2013.01);
(Continued)

(58) Field of Classification Search
CPC ................. G02B 5/3058; G02F 1/133548
See application file for complete search history.

(56) References Cited

U.S. PATENT DOCUMENTS

| 2008/0186576 A1* | 8/2008 | Takada | G02B 5/3025 349/5 |
| 2015/0002791 A1* | 1/2015 | Nam | G02B 5/3058 359/485.05 |
| 2018/0180786 A1* | 6/2018 | Takeda | G02B 5/3058 |

FOREIGN PATENT DOCUMENTS

| JP | 2005242080 A | 9/2005 |
| JP | 2008216956 | 9/2008 |

(Continued)

OTHER PUBLICATIONS

"Japanese Application Serial No. 2020-012625, Office Action dated Jun. 6, 2023", w English Translation, (Jun. 6, 2023), 7 pgs.

*Primary Examiner* — Ryan S Dunning
(74) *Attorney, Agent, or Firm* — Schwegman Lundberg & Woessner, P.A.

(57) ABSTRACT

Provided is a polarizing plate having a wire grid structure, comprising a transparent substrate, a first antireflection film laminated on the first surface of the transparent substrate, a plurality of protrusions protruding from the first antireflection film, a second antireflection layer laminated on a second surface opposite to the first surface, wherein the plurality of protrusions are periodically arranged at a pitch shorter than a wavelength of light in a use band, each of the protrusions extends in in a first direction and includes a reflective layer, a dielectric layer, and an absorption layer in order from the first direction, and both the first antireflection layer and the second antireflection layer have high refractive index layers and low refractive index layers that are alternately laminated.

8 Claims, 5 Drawing Sheets

(51) Int. Cl.
 *G02B 1/115* (2015.01)
 *G02B 5/30* (2006.01)
 *G02F 1/1335* (2006.01)
 *G02B 1/11* (2015.01)

(52) U.S. Cl.
 CPC .. *G02F 1/133528* (2013.01); *C03C 2217/212* (2013.01); *C03C 2217/213* (2013.01); *C03C 2217/218* (2013.01); *C03C 2217/734* (2013.01); *C03C 2218/152* (2013.01); *C03C 2218/154* (2013.01); *C03C 2218/33* (2013.01)

(56) References Cited

FOREIGN PATENT DOCUMENTS

| | | |
|---|---|---|
| JP | 2008216957 | 9/2008 |
| JP | 2009109636 | 5/2009 |
| JP | 2010060587 A | 3/2010 |
| JP | 2012242449 | 12/2012 |
| JP | 2013228688 | 11/2013 |
| JP | 2016038537 A | 3/2016 |
| JP | 2018106130 | 7/2018 |

\* cited by examiner

POLARIZING PLATE HAVING OUTERMOST LAYER OF ANTI-REFLECTION LAYER RECESSED TOWARDS SUBSTRATE

CLAIM FOR PRIORITY

This application claims the benefit of priority of Japanese Patent Application No. 2020-012625, filed Jan. 29, 2020, the contents of which are incorporated herein by reference.

TECHNICAL FIELD

The present invention relates to a polarizing plate, an optical apparatus and method of manufacturing a polarizing plate.

BACKGROUND ART

Polarizing plates are used in liquid crystal displays and the like. In recent years, attention has been focused to wire grid polarizing plates in which reflective layers are arranged at intervals which are shorter than a wavelength of light in a use band.

For example, Patent Literature 1 describes a polarizing plate having an antireflection layer and a wire grid in this order on a substrate. The antireflection layer in Patent Literature 1 is composed of hollow particles and a binder.

Further, for example, Patent Literature 2 describes a wire grid polarizer in which an antireflection coating is applied to a surface of the substrate opposite to the surface on which the wire grid is formed.

Further, for example, Patent Literature 3 describes a polarizing element having an antireflection layer on a surface opposite to the surface on which the wire grid of the substrate is formed.

CITATION LIST

Patent Literatures

[Patent Literature 1]
    Japanese Unexamined Patent Application, First Publication No. 2016-38537
[Patent Literature 2]
    Japanese Unexamined Patent Application, First Publication No. 2005-242080
[Patent Literature 3]
    Japanese Unexamined Patent Application, First Publication No. 2010-60587

SUMMARY OF INVENTION

Technical Problem

In recent years, high brightness and high definition of liquid crystal projectors and the like are required, and a polarizing plate having high transmittance characteristics is required.

The present invention has been made in view of the above problems, and an object of the present invention is to provide a polarizing plate having a high transmission axis transmittance and an optical device therewith.

Solution to Problem

The present invention provides the following means for solving the above problems.

According to the first aspect of the present invention, there is provided a polarizing plate having a wire grid structure comprising a transparent substrate, a first antireflection film laminated on the first surface of the transparent substrate, a plurality of protrusions protruding from the first antireflection film, a second antireflection layer laminated on a second surface opposite to the first surface, wherein the plurality of protrusions are periodically arranged at a pitch shorter than a wavelength of light in a use band, each of the protrusions extends in in a first direction and includes a reflective layer, a dielectric layer, and an absorption layer in order from the first direction, and both the first antireflection layer and the second antireflection layer have high refractive index layers and low refractive index layers that are alternately laminated.

In the polarizing plate according to the above aspect, both the first antireflection layer and the second antireflection layer have five layer may be composed of 5 or more and 10 or less layers.

In the polarizing plate according to the above aspect, the high refractive index layers may be composed of $TiO_2$ or $Nb_2O_5$, and the low refractive index layers are composed of $SiO_2$.

In the polarizing plate according to the above aspect, the surface of the non-overlapped region that does not overlap with the plurality of protrusions of the first antireflection layer may be closer to the transparent substrate than the surface of the overlapped region that overlaps with the plurality of convex portions.

In the polarizing plate according to the above aspect, the difference between the film thickness of the overlapped region that overlaps the plurality of protrusions of the first antireflection layer and the film thickness of the non-overlapped region that does not overlap the plurality of protrusions may be 9% or less of the film thickness of the overlapped region.

In the polarizing plate according to the above aspect, the difference between the film thickness of the overlapped region that overlaps the plurality of protrusions of the first antireflection layer and the film thickness of the non-overlapped region that does not overlap the plurality of protrusions may be 30 nm or less.

According to the second aspect of the present invention, there is a provided an optical apparatus comprising the polarizing plate according to the above aspect.

According to the third aspect of the present invention, there is a provided a method of manufacturing a polarizing plate comprising a step of laminating alternately high-refractive index layers and low-refractive index layers on both sides of the transparent substrate, and forming the first antireflection layer and the second antireflection layer on them, a step of laminating a reflective layer, a dielectric layer, and an absorbing layer in this order on the first antireflection layer to form a laminate, and a step of processing the laminate to form a plurality of protrusions that are periodically arranged at a pitch shorter than the wavelength of light in use band.

A method of manufacturing a polarizing plate according to the above aspect, a non-overlapped region of the first antireflection layer that does not overlap with the plurality of protrusions may be etched through the plurality of protrusions.

Advantageous Effects of Invention

According to the polarizing plate and the optical apparatus according to the above aspect, the transmission axis transmittance can be increased.

DESCRIPTION OF EMBODIMENTS

Hereinafter, the present embodiments will be described in detail with appropriate reference to the drawings. The drawings used in the following description may sometimes be drawn with specific portions enlarged to facilitate comprehension of the features of the present invention, and the dimensional ratios and the like between the constituent elements may differ from the actual values. The materials and dimensions and the like presented in the following description are merely examples, which in no way limit the present invention, and may be altered as appropriate within the scope of the present invention.

[Polarizing Plate]

Figure 1:
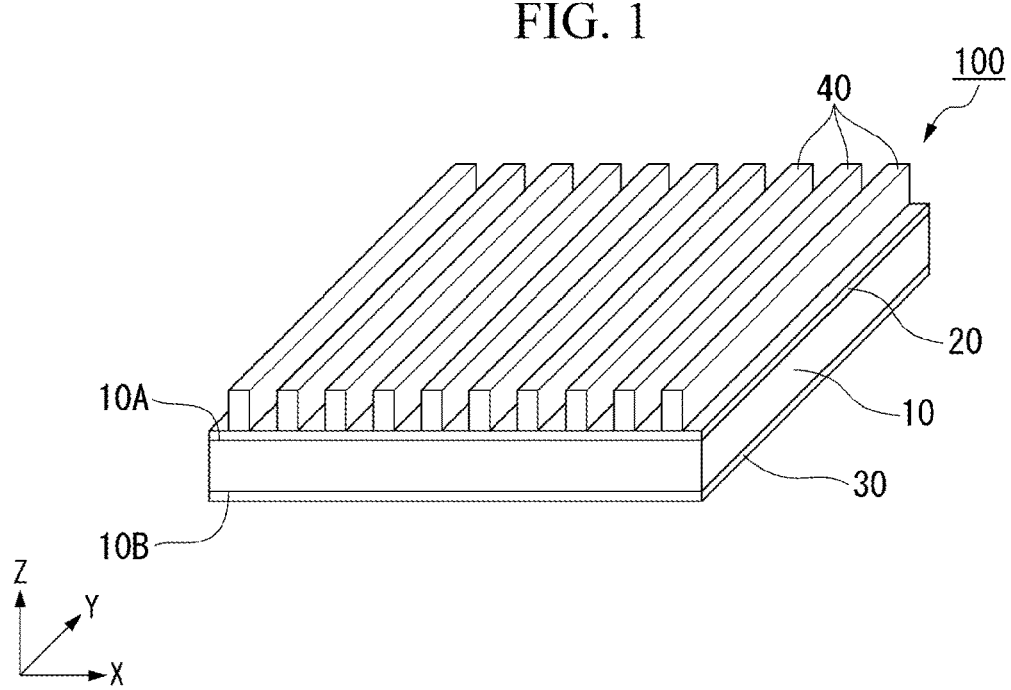
FIG. 1 is a perspective diagram of the polarizing plate according to a first embodiment.

FIG. 1 is a perspective view of the polarizing plate 100 according to the first embodiment. The polarizing plate 100 includes a transparent substrate 10, a first antireflection layer 20, a second antireflection layer 30, and a plurality of protrusions 40. The first antireflection layer 20 is laminated on the first surface 10A of the transparent substrate 10. The second antireflection layer 30 is laminated on the second surface 10B of the transparent substrate 10. The plurality of protrusions 40 project from the first antireflection layer 20. The second surface 10B is a surface of the transparent substrate 10 opposite to the first surface 10A.

Here we define the direction. The inside of the plane where the transparent substrate 10 spreads is the inside of the XY plane, and the direction in which the protrusions 40 extends is the Y direction. The direction orthogonal to the Y direction is defined as the X direction. The direction orthogonal to the X direction and the Y direction is defined as the Z direction. The Y direction is an example of the first direction.

The polarizing plate 100 attenuates a polarized wave (TE wave (S wave)) having an electric field component parallel to the Y direction in which the protrusions 40 extends, and transmits a polarized wave (TM wave (P wave)) having an electric field component perpendicular to the Y direction. The polarizing plate 100 has an absorption axis in the Y direction and a transmission axis in the X direction. The polarizing plate 100 attenuates TE waves by four actions of transmission, reflection, interference, and selective light absorption of polarized waves due to optical anisotropy, and transmits TM waves.

[Transparent Substrate]

The transparent substrate 10 has transparency for light having a wavelength in a use band of the polarizing plate 100. The expression "has transparency" does not necessarily mean that the substrate transmits 100% of the light of the wavelength in the use band, provided that sufficient light is transmitted to enable the functionality as a polarizing plate to be maintained. An average thickness of the transparent substrate 10 is preferably 0.3 mm or more and 1 mm or less.

A material having a refractive index of 1.1 or more and 2.2 or less is preferably used for the transparent substrate 10. The transparent substrate 10 is, for example, glass, quartz, sapphire, etc. can be used. A component composition of the glass material used as the transparent substrate 10 is not particularly limited.

For example, silicate glass is widely available as optical glass, and is inexpensive. Further, quartz glass (having a refractive index of 1.46) and soda lime glass (having a refractive index of 1.51) have a low cost and have excellent transparency. In contrast, quartz and sapphire are excellent in thermal conductivity. The material of the transparent substrate 10 can be appropriately selected depending on the performance required of the polarizing plate 100. For example, since a polarizing plate for an optical engine of a projector is irradiated with strong light, it is required to have light resistance and heat dissipation. For this reason, quartz and sapphire are preferably used for the transparent substrate 10 for projector use.

In the case in which the transparent substrate 10 is an optically active crystal such as quartz or sapphire, when the direction in which the protrusions 40, which will be described later, extends is parallel to or perpendicular to the optical axis of the crystal, the optical characteristics are improved. The optical axis is a directional axis that minimizes the difference in refractive index between ordinary light rays and abnormal light rays traveling in that direction.

Figure 2:
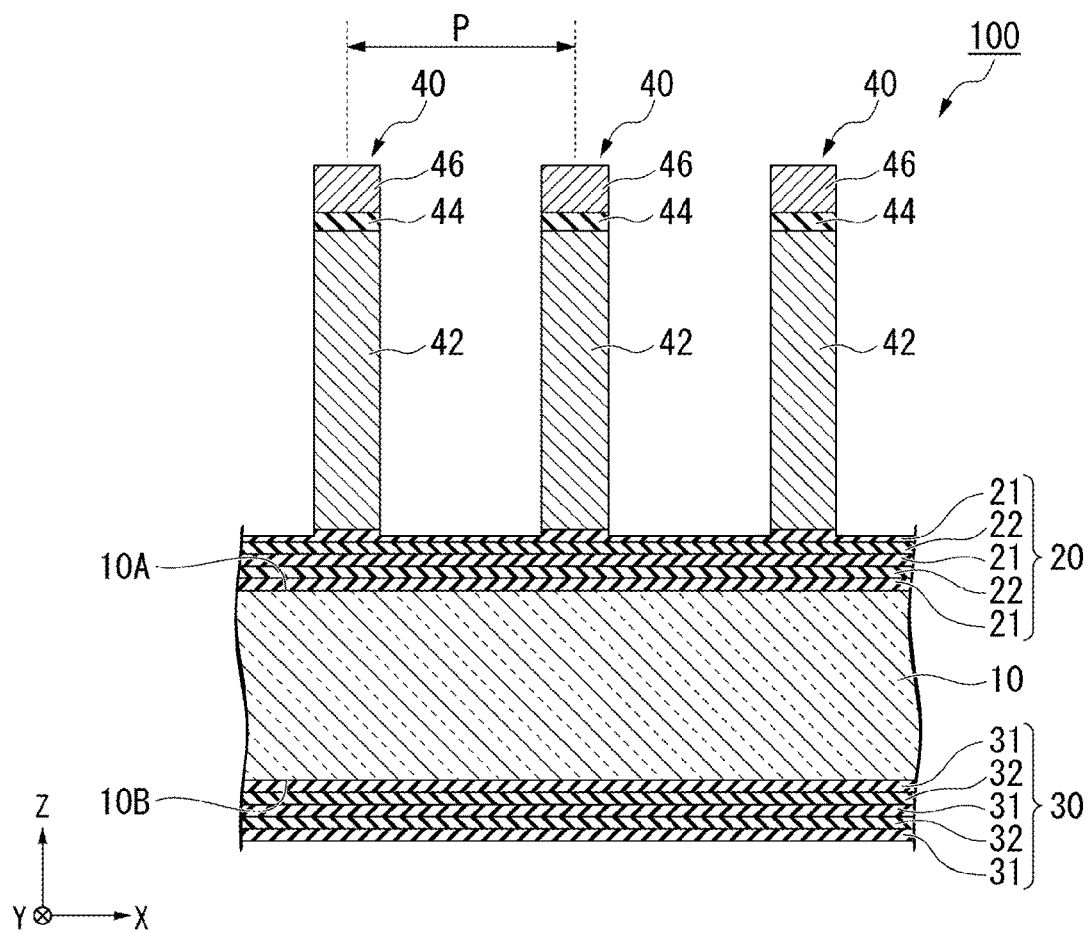
FIG. 2 is a cross-sectional schematic diagram of the polarizing plate according to a first embodiment.
Figure 3:
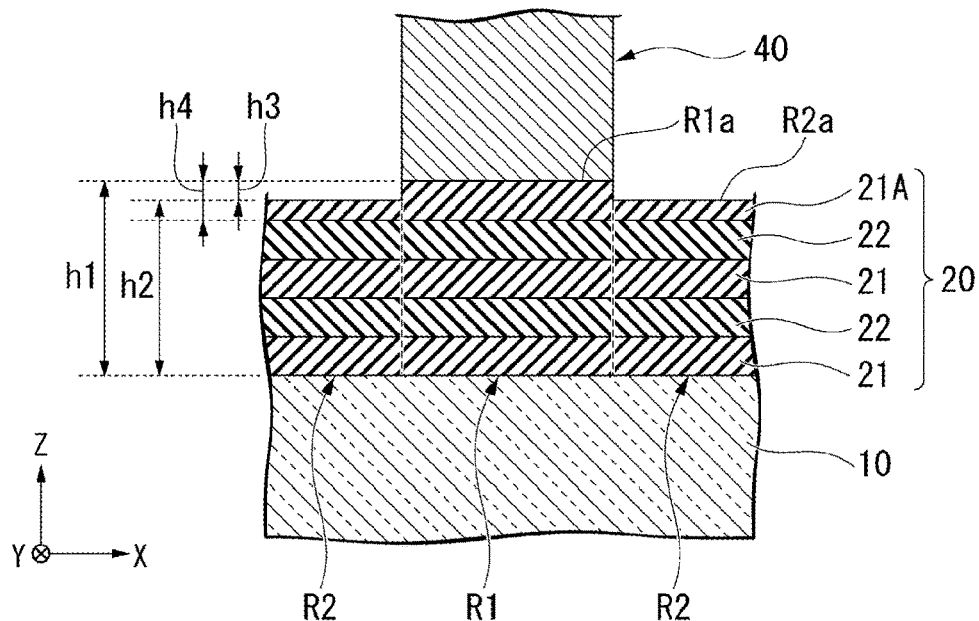
FIG. 3 is a cross-sectional schematic diagram of the characteristic part of the polarizing plate according to a first embodiment.

The first antireflection layer 20 is on the first surface 10A of the transparent substrate 10. The first antireflection layer 20 is located between the transparent substrate 10 and the plurality of protrusions 40. FIG. 2 is a cross-sectional view of the polarizing plate 100 according to the first embodiment. FIG. 3 is a cross-sectional view of a characteristic portion of the polarizing plate 100 according to the first embodiment. FIG. 3 is an enlarged cross-sectional view of the first antireflection layer 20 of the polarizing plate 100.

The first antireflection layer 20 prevents reflection by utilizing the interference of light. In the first antireflection layer 20, low refractive index layers 21 and high refractive index layers 22 are alternately laminated. The low refractive index layer 21 has a lower refractive index than the adjacent layers. The high refractive index layer 22 has a higher refractive index than the adjacent layers. The refractive index of the low refractive index layer 21 is, for example, greater than 1.0 and lower than the refractive index of the transparent substrate 10. The high refractive index layer 22 has a higher refractive index than, for example, the low refractive index layer 21.

The low refractive index layer 21 and the high refractive index layer 22 are dielectric layers. The low refractive index layer 21 and the high refractive index layer 22 includes, for example, oxides such as Si oxide, Ti oxide, Zr oxide, Al oxide, Nb oxide, Ta oxide, Bi oxide, Be oxide and the like, magnesium fluoride, cryolite, germanium, silicon, and carbon. For example, the low refractive index layer 21 is $SiO_2$, and the high refractive index layer 22 is $TiO_2$ or $NbO_2$.

The film thickness of each of the low refractive index layer 21 and the high refractive index layer 22 is appropriately selected depending on the wavelength range of light in the use band and the like. The film thickness of each layer of the low refractive index layer 21 and the high refractive index layer 22 is, for example, 1 nm or more and 500 nm or less. The film thickness of each layer of the low refractive index layer 21 and the high refractive index layer 22 may be different from each other.

The number of layers of the first antireflection layer 20 is not particularly limited, but is, for example, 5 or more and 10 or less. If the number of layers is small, the antireflection function is lowered, and if the number of layers is large, the cost increases.

The first antireflection layer 20 is composed of an overlapped region R1 that overlaps the protrusion 40 and a non-overlapped region R2 that does not overlap the protrusion 40 when viewed in a plan view from the Z direction. In the first antireflection layer 20, for example, the non-overlapped region R2 is dug into the transparent substrate 10 side, and the non-overlapped region R2 is recessed toward the transparent substrate 10 side with respect to the overlapped region R1. The surface R2a of the non-overlapped region R2 is, for example, closer to the transparent substrate 10 than the surface R1a of the overlapped region R1.

The film thickness h1 of the overlapped region R1 is different from, for example, the film thickness h2 of the non-overlapped region R2. The film thickness h1 of the overlapped region R1 corresponds to the total thickness of the first antireflection layer 20. The film thickness h1 of the overlapped region R1 is, for example, 200 nm or more and 700 nm or less. If the film thickness h1 is thin, variations occur in the characteristics of the antireflection film. If the film thickness h1 is thick, the manufacturing cost is high, and the film is likely to be peeled off or cracked.

The film thickness h2 of the non-overlapped region R2 is, for example, thinner than the film thickness h1 of the overlapped region R1. The film thickness difference h3 between the film thickness h1 of the overlapped region R1 and the film thickness h2 of the non-overlapped region R2 is, for example, greater than 0% of the film thickness h1 of the overlapped region R1 and 10% or less, and, for example, is 9% or less of the film thickness h1 of the overlapped region R1. The film thickness difference h3 is, for example, greater than 0 nm and less than 40 nm, and is 10 nm or more and 30 nm or less.

The layer of the first antireflection layer 20 farthest from the transparent substrate 10 is referred to as an outermost layer 21A. The outermost layer 21A is, for example, a low refractive index layer. In the outermost layer 21A, the non-overlapped region R2 is recessed toward the transparent substrate 10 from the overlapped region R1. For example, the non-overlapped region R2 is recessed toward the transparent substrate 10 from the overlapped region R1 in the outermost layer 21A. The film thickness difference h3 with respect to the film thickness h4 of the outermost layer 21A in the overlapped region R1 is, for example, 10% or more and 35% or less.

The first antireflection layer 20 can be formed by, for example, a vacuum deposition method, a sputtering method, a chemical vapor deposition (CVD) method, or an atomic layer deposition (ALD) method.

[Second Antireflection Layer]

The second antireflection layer 30 is on the second surface 10B of the transparent substrate 10. The first antireflection layer 30 prevents reflection by utilizing the interference of light. In the second antireflection layer 30, low refractive index layers 31 and high refractive index layers 32 are alternately laminated. The low refractive index layer 31 has a lower refractive index than the adjacent layers. The high refractive index layer 32 has a higher refractive index than the adjacent layers. The configuration of the low refractive index layer 31 and the high refractive index layer 32 is the same as that of the low refractive index layer 21 and the high refractive index layer 22 of the first antireflection layer 20 except that the outermost layer 21A is not recessed.

[Protrusions]

The protrusions 40 protrude from the transparent substrate 10 in the z direction, and extend in the y direction. The protrusions 40 are periodically arranged in the x direction. A pitch P between the neighboring protrusions 40 in the x direction is shorter than the wavelength of the light in the use band of the polarizing plate 100. For example, the pitch P is preferably 100 nm or more and 200 nm or less. If the pitch P is within this range, the protrusions 40 are easily made, and mechanical stability and stability of optical properties of the protrusions 40 are improved.

The pitch P between the neighboring protrusions 40 can be measured as an average value by a scanning electron microscope or a transmission electron microscope. For example, a distance between the neighboring protrusions 40 in the x direction may be measured at four random locations, and the pitch P obtained as an arithmetic mean thereof. A measurement method for averaging the measured values at four random locations among the plurality of the protrusions 40 is referred to as an electron microscopy method.

The protrusions 40 protrude from the transparent substrate 10. A main direction in which the protrusions 40 protrude is, for example, the z direction. An average width of the protrusions 40 in the x direction is preferably 20% or more and 50% or less of the pitch P. Here, the average width of the protrusions 40 means an average value of the widths at each point obtained by dividing the protrusions 40 into 10 parts in the z direction. A height of each of the protrusions 40 is, for example, 250 nm or more and 400 nm or less. Further, an aspect ratio obtained by dividing the height of each of the protrusions 40 by the average width is, for example, 5 or more and 13.3 or less.

The protrusions 40 includes a reflective layer 42, a dielectric layer 44, and an absorbing layer 46 in this order from the outermost layer 21A side of the first antireflection layer 20. When the light incident on the polarizing plate 100 from the first surface 10A side passes through the absorption layer 46 and the dielectric layer 44, a part of the light is absorbed and attenuated. Of the light transmitted through the absorption layer 46 and the dielectric layer 44, TM (P wave) is transmitted through the reflection layer 42. On the other hand, of the light transmitted through the absorption layer 46 and the dielectric layer 44, TE (S wave) is reflected by the reflection layer 42. When the reflected TE wave passes through the absorption layer 46 and the dielectric layer 44, a part of the reflected TE wave is absorbed, and a part of the reflected TE wave is reflected again and returns to the reflection layer 42. The TE wave reflected by the reflection layer 42 interferes with and is attenuated when passing through the absorption layer 46 and the dielectric layer 44. The polarizing plate 100 exhibits polarization characteristics due to the selective attenuation of TE waves as described above.

[Reflective Layer]

The reflective layer 42 is on the outermost layer 21A of the first antireflection layer 20. Another layer may be inserted between the outermost layer 21A of the first antireflection layer 20 and the reflection layer 42. The reflective layer 42 protrudes from the transparent substrate 10 in the z direction, and extends in a strip shape in the y direction. The reflective layer 42 reflects a TE wave (an S wave) and transmits a TM wave (a P wave). The height of the reflective layer 42 is, for example, 100 nm or more and 300 nm or less.

The reflective layer 42 includes a material having reflectivity with respect to light having a wavelength in the use band. The reflective layer 42 includes, for example, an elemental metal such as Al, Ag, Cu, Mo, Cr, Ti, Ni, W, Fe, Si, Ge, Ta, or the like, or an alloy thereof. The reflective layer 42 is made of, for example, aluminum or an aluminum alloy. The reflective layer 42 is not limited to metal, and may be an inorganic film or a resin film whose surface reflectance is increased by coloring or the like.

The reflective layer 42 can be formed into a high-density film by, for example, a vapor deposition method or a sputtering method. The reflective layer 42 may be composed of two or more layers having different constituent materials.

[Dielectric Layer]

The dielectric layer 44 is laminated, for example, on the reflective layer 42. The dielectric layer 44 does not necessarily need to be in contact with the reflective layer 42, and another layer may be present between the dielectric layer 44 and the reflective layer 42. The dielectric layer 44 extends in a strip shape in the y direction.

A thickness of the dielectric layer 44 can be determined depending on a polarized wave reflected by the absorption layer 46. The thickness of the dielectric layer 44 is such that the phase of the polarized wave reflected by the absorbing layer 46 and the phase of the polarized wave reflected by the reflecting layer 42 are deviated by half a wavelength. The thickness of the dielectric layer 44 is, for example 1 nm or more and 500 nm or less. If the thickness of the dielectric layer 44 is within this range, a relationship between the phases of the two reflected polarized waves can be adjusted, and an interference effect can be enhanced. The thickness of the dielectric layer 44 can be measured using the aforementioned electron microscopy method.

The dielectric layer 44 includes, for example, a metal oxide, magnesium fluoride ($MgF_2$), cryolite, germanium, silicon, boron nitride, carbon, or combinations thereof. Metal oxides include, for example, a Si oxide such as $SiO_2$, $Al_2O_3$, a beryllium oxide, a bismuth oxide, a boron oxide, a tantalum oxide, and so on. The dielectric layer 44 is, for example, a Si oxide or a Ti oxide.

A refractive index of the dielectric layer 44 is, for example, greater than 1.0 and smaller than or equal to 2.5. The optical characteristics of the reflective layer 42 are also influenced by a surrounding refractive index (e.g., the refractive index of the dielectric layer 44). Therefore, the refractive index of the dielectric layer 44 is adjusted, and thereby polarization characteristics of the polarizing plate can be controlled.

The dielectric layer 44 can be formed by, for example, a vacuum deposition method, a sputtering method, a chemical vapor deposition (CVD) method, or an atomic layer deposition (ALD) method. The dielectric layer 44 may be composed of two or more layers.

[Absorption Layer]

The absorption layer 46 is, for example, laminated on the dielectric layer 44. The absorption layer 46 extends in a strip shape in the y direction. The film thickness of the absorption layer 46 is, for example, 5 nm or more and 50 nm or less. The film thickness of the absorption layer 46 can be measured by the aforementioned electron microscopy.

The absorption layer 46 has one or more materials having a light absorption function in which an extinction constant which is an optical constant is not zero. The absorption layer 46 includes a metal material or a semiconductor material. The material used for the absorption layer 46 can be appropriately selected according to a wavelength range of light in the use band of the polarizing plate.

In a case where the metal material is used for the absorption layer 46, the metal material is, for example, an elemental metal such as Ta, Al, Ag, Cu, Au, Mo, Cr, Ti, W, Ni, Fe, Sn, or the like, or an alloy containing one or more elements. Further, in a case where the semiconductor material is used for the absorption layer 46, the semiconductor material is, for example, Si, Ge, Te, ZnO, a silicide. The silicide is, for example, $\beta$-$FeSi_2$, $MgSi_2$, $NiSi_2$, $BaSi_2$, $CrSi_2$, TaSi, and so on. The polarizing plate 100 in which these materials are used for the absorption layer 46 has a high extinction ratio with respect to the visible light range. Further, the absorption layer 46 includes, for example, Fe or Ta, and Si.

In the case where the semiconductor material is used for the absorption layer 46, a band-gap energy of a semiconductor contributes to an absorption action of light. For this reason, the band-gap energy of the semiconductor material is less than or equal to the value obtained by converting the wavelength in the use band into energy. For example, in a case where the use band is the visible light range, a semiconductor material having a band-gap energy of 3.1 eV or less with respect to the absorption energy at a wavelength of 400 nm or more is preferably used for the absorption layer 46.

The absorption layer 46 is not limited to one layer and may be composed of two or more layers. In a case where the absorption layer 46 has two or more layers, materials of these layers may be different. The absorption layer 46 can be formed by a method such as vapor deposition, a sputtering method, or the like.

[Protective Film, Water-Repellent Film]

The polarizing plate 100 may have other components in addition to the transparent substrate 10, the first antireflection layer 20, the second antireflection layer 30, and the protrusions 40. For example, a protective film may be formed on an incident side of light of the polarizing plate 100. The protective layer enhances reliability such as heat resistance of the polarizing plate 100. Further, for example, a water-repellent film may be provided on the surface of the protrusions 40. The water-repellent film is made of, for example, a fluorine-based silane compound such as perfluorodecyltriethoxysilane (FDTS). The water-repellent film can be formed by, for example, a CVD method or an ALD method. The water-repellent film enhances reliability such as moisture resistance of the polarizing plate 100.

[Method of Manufacturing Polarizing Plate]

The method for manufacturing the polarizing plate 100 according to the present embodiment includes a step of laminating a first antireflection layer 20 and a second antireflection layer 30 on a transparent substrate 10, a step of forming a laminate (laminated body, layered body) which is the base of the protrusions 40 on the first antireflection layer 20, and a step of processing the laminate into the protrusions 40.

First, the low refractive index layers 21 and 31 and the high refractive index layers 22 and 32 are alternately laminated on the first surface 10A and the second surface 10B of the transparent substrate 10, respectively. The low refractive index layers 21 and 31 and the high refractive index layers 22 and 32 are formed by, for example, vapor deposition, sputtering, CVD, or ALD. The number of layers of the low refractive index layers 21 and 31 and the high refractive index layers 22 and 32 can be appropriately changed. The film thicknesses of the low refractive index layers 21 and 31 and the high refractive index layers 22 and 32 are appropriately selected depending on the wavelength range of light in the use band and the like. The low refractive index layers 21 and 31 and the high refractive index layers 22 and 32 are alternately laminated to form the first antireflection layer 20 on the first surface 10A and the second antireflection layer 30 on the second surface 10B.

Next, in the film forming step, a layer to be a reflective layer, a layer to be a dielectric layer, and a layer to be an absorption layer are laminated in this order on the first antireflection layer 20 of the transparent substrate 10 to form a laminate. These layers are formed, for example, by sputtering or vapor deposition.

Next, the laminate is processed. For processing the laminate, for example, a photolithography method, a nanoimprint method, or the like is used. For example, a mask pattern is formed with a resist in a one-dimensional lattice pattern on one surface of the laminate. The protrusions 40 is formed by selectively etching the portion where the resist is not formed. Etching is performed by, for example, dry etching.

Further, when forming the protrusions 40, by adjusting the etching time and performing etching, a portion of the outermost layer 21A of the first antireflection layer 20 that does not overlap with the protrusions 40 may be dug. By removing a portion of the outermost layer 21A, the surface R2a of the non-overlapped region R2 becomes closer to the transparent substrate 10 than the surface R1a of the overlapped region R1.

The polarizing plate 100 according to the first embodiment is obtained by the above procedure. A protective layer and a water-repellent layer may be further formed on the light-irradiated surface of the polarizing plate 100.

The polarizing plate 100 according to the first embodiment has a high transmittance in the transmission axis direction (transmission axis transmittance) because it has antireflection layers on both sides of the transparent substrate 10. Further, by digging the non-overlapped region R2 that does not overlap with the protrusions 40 of the first antireflection layer 20 with respect to the overlapped region R1, the transmission axis transmittance is further improved. Further, by adjusting the amount of digging in the non-overlapped region R2 with respect to the overlapped region R1, the transmission axis transmittance can be improved according to the wavelength range used.

Although the first embodiment has been described in detail so far, the present invention is not limited to the configuration. Various modifications and changes are possible within the range in which the effects of the present invention are exhibited.

Figure 4:
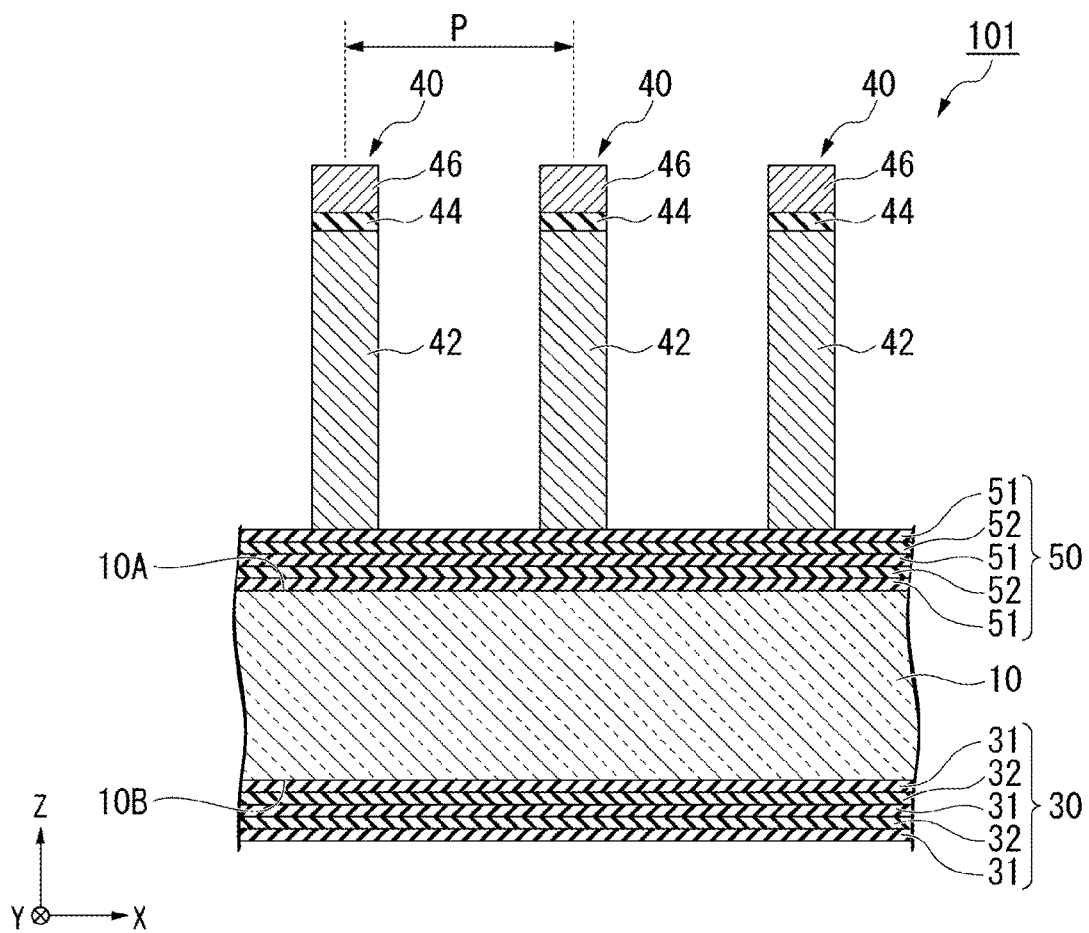
FIG. 4 is a cross-sectional schematic diagram of the polarizing plate according to a first modification example.

For example, FIG. 4 is a cross-sectional view of the polarizing plate 101 according to the first modification. The polarizing plate 101 shown in FIG. 4 has a structure of the first antireflection layer 50 different from that of the polarizing plate 100 shown in FIG. 2. Other structures are the same as those of the polarizing plate 100 shown in FIG. 2, and the same reference numerals are given to the same structures, and the description thereof will be omitted.

In the first antireflection layer 50, the low refractive index layer 51 and the high refractive index layer 52 are alternately laminated. The low refractive index layer 51 has a lower refractive index than the adjacent layers. The high refractive index layer 52 has a higher refractive index than the adjacent layers. The structure of the low refractive index layer 51 and the high refractive index layer 52 is the same as that of the low refractive index layer 21 and the high refractive index layer 22 of the first antireflection layer 20 described above, except that the outermost layer is not dented.

Since the polarizing plate 101 according to the first modification also has antireflection layers on both sides of the transparent substrate 10, the transmission axis transmittance is high.

[Optical Apparatus]

An optical apparatus according to a second embodiment includes the polarizing plates 100 and 101 according to the first embodiment. Examples of the optical apparatus may include a liquid crystal projector, a head-up display, a digital camera, and so on. The polarizing plates 100 and 101 according to the first embodiment are excellent in reliability and can be used for various purposes. The polarizing plates 100 and 101 are made of an inorganic material. The polarizing plates 100 and 101 are particularly preferably used for liquid crystal projectors, head-up displays and the like, which require higher heat resistance than organic polarizing plates.

In a case where the optical apparatus includes a plurality of polarizing plates, at least one of the plurality of polarizing plates may be the polarizing plate 100 or the polarizing plate 101 according to the first embodiment. For example, when the optical apparatus is a liquid crystal projector, polarizing plates are arranged on the incident side and the outgoing side of the liquid crystal panel. As one of the polarizing plates, the polarizing plate 100 or the polarizing plate 101 according to the first embodiment are used. For example, each of a polarizing plate in which light in the red wavelength band is incident, a polarizing plate in which light in the green wavelength band is incident, and a polarizing plate in which light in the blue wavelength band is incident may have unique film thickness difference h3.

Although the preferred embodiments of the present invention have been described in detail above, the present invention is not limited to the specific embodiments, and various modifications and changes are possible within the range in which the effects of the present invention are exhibited.

EXAMPLES

Example 1

The polarizing plate 100 shown in FIG. 2 was reproduced, and the transmittance of the polarizing plate 100 was determined by simulation. The simulation was performed by an electromagnetic field simulation by the RCWA (Rigorous Coupled Wave Analysis) method.

Table 1 summarizes the configurations of the first antireflection layer 20 and the second antireflection layer 30 in the light plate 100. In Table 1, the first layer is the layer closest to the transparent substrate 10, and the second layer, the third layer, the fourth layer, and the fifth layer are separated from the transparent substrate 10 in this order. The structures of the first antireflection layer 20 and the second antireflection layer 30 are the same except that the outermost layer of the first antireflection layer 20 is dug. The digging depth (film thickness difference h3 between the film thickness h1 of the overlapped region R1 and the film thickness h2 of the non-overlapped region R2) of the outermost layer (fifth layer in Table 1) of the first antireflection layer 20 is 10 nm. The ratio of the digging depth to the total thickness of the first antireflection layer 20 was 2.5%.

TABLE 1

|  | CONSTITUENT MATERIALS | FILM THICKNESS (nm) |
| --- | --- | --- |
| FIRST LAYER | $SiO_2$ | 151.98 |
| SECOND LAYER | $Nb_2O_5$ | 11.64 |
| THIRD LAYER | $SiO_2$ | 34.79 |
| FOURTH LAYER | $Nb_2O_5$ | 112.29 |
| FIFTH LAYER | $SiO_2$ | 86.56 |
| TOTAL |  | 397.26 |

The structure of the protrusions 40 is as follows.
Reflective layer 42: Al with a film thickness of 250 nm
Dielectric layer 44: $SiO_2$ with a film thickness of 5 nm
Absorption layer 46: FeSi with a film thickness of 25 nm
Pitch of protrusions 40: 141 nm Example 2

Example 2 is different from Example 1 only in that the digging depth (the film thickness difference h3 between the film thickness h1 of the overlapped region R1 and the film thickness h2 of the non-overlapped region R2) of the outermost layer (fifth layer in Table 1) of the first antireflection layer 20 is 20 nm. The ratio of the digging depth to the total thickness of the first antireflection layer 20 was 5.0%.

Example 3

Example 3 is different from Example 1 only in that the digging depth (the film thickness difference h3 between the film thickness h1 of the overlapped region R1 and the film thickness h2 of the non-overlapped region R2) of the outermost layer (fifth layer in Table 1) of the first antireflection layer 20 is 30 nm. The ratio of the digging depth to the total thickness of the first antireflection layer 20 was 7.6%.

Example 4

Example 4 is different from Example 1 only in that the digging depth (the film thickness difference h3 between the film thickness h1 of the overlapped region R1 and the film thickness h2 of the non-overlapped region R2) of the outermost layer (fifth layer in Table 1) of the first antireflection layer 20 is 40 nm. The ratio of the digging depth to the total thickness of the first antireflection layer 20 was 10.0%.

Example 5

Example 5 is different from Example 1 in that the outermost layer (fifth layer in Table 1) of the first antireflection layer 20 is not dug. Example 5 satisfies the structure of the polarizing plate 101 shown in FIG. 4.

Comparative Example 1

Comparative Example 1 is different from Example 5 in that the first antireflection layer 20 is not provided on the first surface 10A of the transparent substrate 10 and the second antireflection layer 30 is provided on the second surface 10B.

Figure 5:
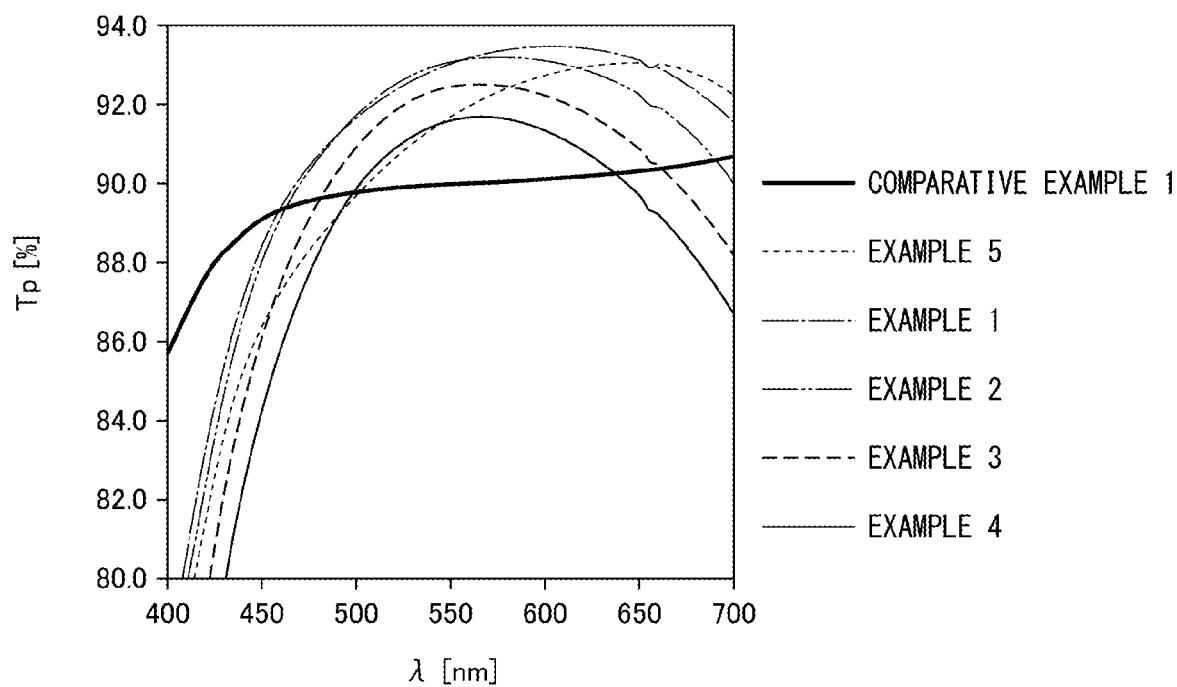
FIG. 5 shows the transmission axis transmittance of Examples 1 to 5 and Comparative Example 1.
Figure 6:
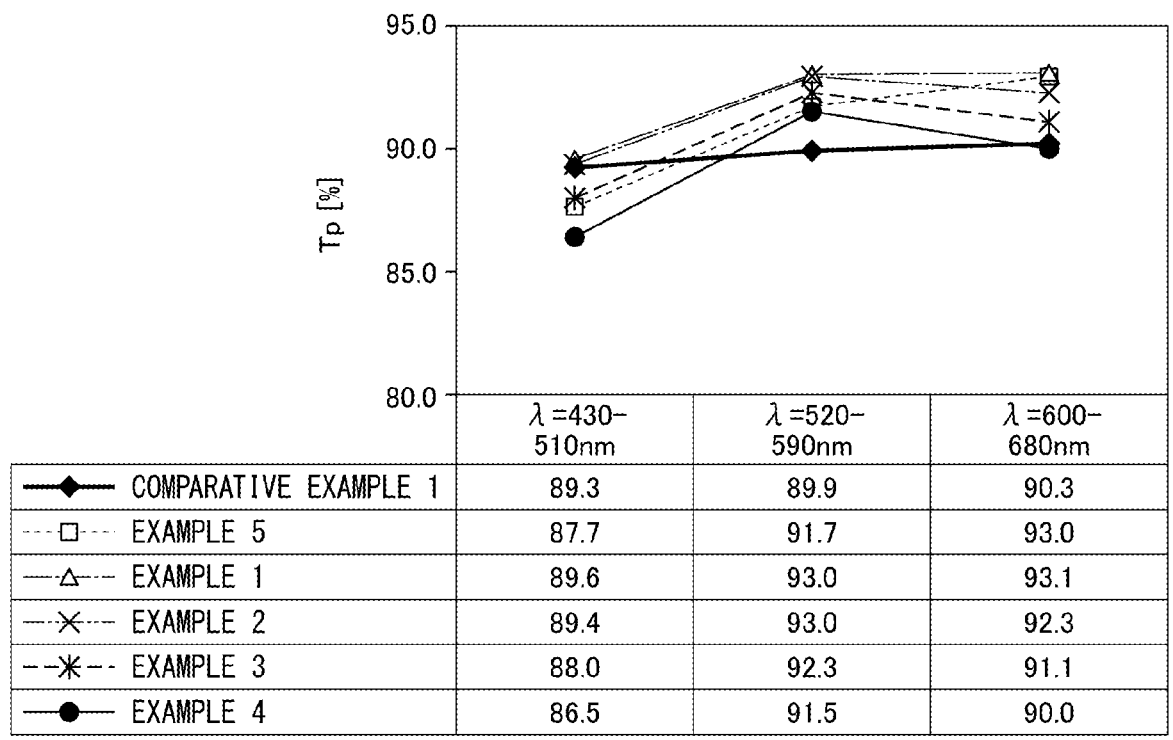
FIG. 6 is a diagram summarizing the transmission axis transmittances of Examples 1 to 5 and Comparative Example 1 for each wavelength.

FIG. 5 shows the transmission axis transmittances of Examples 1 to 5 and Comparative Example 1. FIG. 6 is a diagram summarizing the transmission axis transmittances of Examples 1 to 5 and Comparative Example 1 for each wavelength. In Examples 1 to 5, the transmission axis transmittances were improved as compared with Comparative Example 1 in the wavelength range of 520 nm or more and 630 nm or less, which has high visual sensitivity. In Example 5, the transmission axis transmittance was improved by about 1.8% to 2.7% on average in the entire visible light region as compared with Comparative Example 1. Further, in Examples 1 to 3 in which the digging depth of the outermost layer was 30 nm or less, the transmission axis transmittance was improved in a wider wavelength range than in Example 5 in which the outermost layer was not dug. In Examples 1 and 2, the transmission axis transmittance was improved by about 0.3% to 3.1% on average in the entire visible light region as compared with Comparative Example 1. In Examples 1 and 2, the transmission axis transmittances were improved by about 0.8% to 2.4% on average in the entire visible light region as compared with Comparative Example 1.

In the red wavelength region, Example 1 had the highest transmittance, and in the blue and green wavelength regions, Example 2 had the highest transmittance. Therefore, a higher transmission axis transmittance can be realized by designing the structure of the first antireflection layer 20 according to the wavelength of the use band. For example, the polarizing plate ha ng the configuration of Example 2 was used as the polarizing plate for blue and green of the projector, and the polarizing plate having the configuration of Example 1 may be used as the polarizing plate for red color.

Example 6

The difference from the first embodiment is that the structures of the first antireflection layer 20 and the second antireflection layer 30 in the polarizing plate 100 are changed. Table 2 summarizes the configurations of the first antireflection layer 20 and the second antireflection layer 30 in Example 6. In Table 2, the first layer is the layer closest to the transparent substrate 10, and the second layer, the third layer, the fourth layer, the fifth layer, the sixth layer, the seventh layer, the eighth layer, and the ninth layer are separated from the transparent substrate 10 in this order. The structures of the first antireflection layer 20 and the second antireflection layer 30 are the same except that the outermost layer of the first antireflection layer 20 is dug. The digging depth (film thickness difference h3 between the film thickness h1 of the overlapped region R1 and the film thickness h2 of the non-overlapped region R2) of the outermost layer (ninth layer in Table 2) of the first antireflection layer 20 was set to 10 nm. The ratio of the digging depth to the total thickness of the first antireflection layer 20 was 1.6%.

TABLE 2

|  | CONSTITUENT MATERIALS | FILM THICKNESS (nm) |
| --- | --- | --- |
| FIRST LAYER | $SiO_2$ | 170.99 |
| SECOND LAYER | $TiO_2$ | 12.76 |
| THIRD LAYER | $SiO_2$ | 33.72 |
| FOURTH LAYER | $TiO_2$ | 121.52 |
| FIFTH LAYER | $SiO_2$ | 36.77 |
| SIXTH LAYER | $TiO_2$ | 25.13 |
| SEVENTH LAYER | $SiO_2$ | 39.09 |
| EIGHTH LAYER | $TiO_2$ | 114.39 |
| NINTH LAYER | $SiO_2$ | 86.78 |
| TOTAL |  | 641.15 |

Example 7

Example 7 is different from Example 6 only in that the digging depth (the film thickness difference h3 between the film thickness h1 of the overlapped region R1 and the film thickness h2 of the non-overlapped region R2) of the outermost layer (ninth layer in Table 2) of the first antireflection layer 20 is 20 nm. The ratio of the digging depth to the total thickness of the first antireflection layer 20 was 3.1%.

Example 8

Example 8 is different from Example 6 only in that the digging depth (the film thickness difference h3 between the film thickness h1 of the overlapped region R1 and the film thickness h2 of the non-overlapped region R2) of the outermost layer (ninth layer in Table 2) of the first antireflection layer 20 is 30 nm. The ratio of the digging depth to the total thickness of the first antireflection layer 20 was 4.7%.

Example 9

Example 9 is different from Example 6 only in that the digging depth (the film thickness difference h3 between the film thickness h1 of the overlapped region R1 and the film thickness h2 of the non-overlapped region R2) of the outermost layer (ninth layer in Table 2) of the first antireflection layer 20 is 40 nm. The ratio of the digging depth to the total thickness of the first antireflection layer 20 was 6.2%.

Example 10

Example 10 is different from Example 6 in that the outermost layer (ninth layer in Table 2) of the first antireflection layer 20 is not dug. Example 10 satisfies the structure of the polarizing plate 101 shown in FIG. 4.

Comparative Example 2

Comparative Example 2 is different from Example 10 in that the first antireflection layer 20 is not provided on the first surface 10A of the transparent substrate 10 and the second antireflection layer 30 is provided on the second surface 10B.

Figure 7:
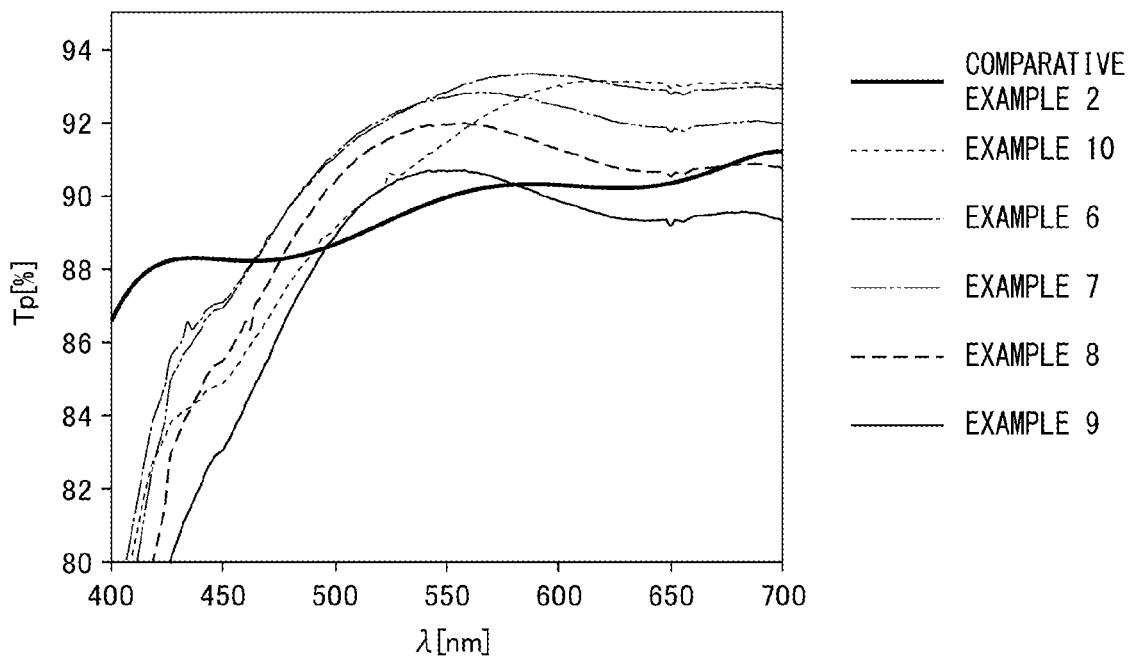
FIG. 7 shows the transmission axis transmittance of Examples 6 to 10 and Comparative Example 2.
Figure 8:
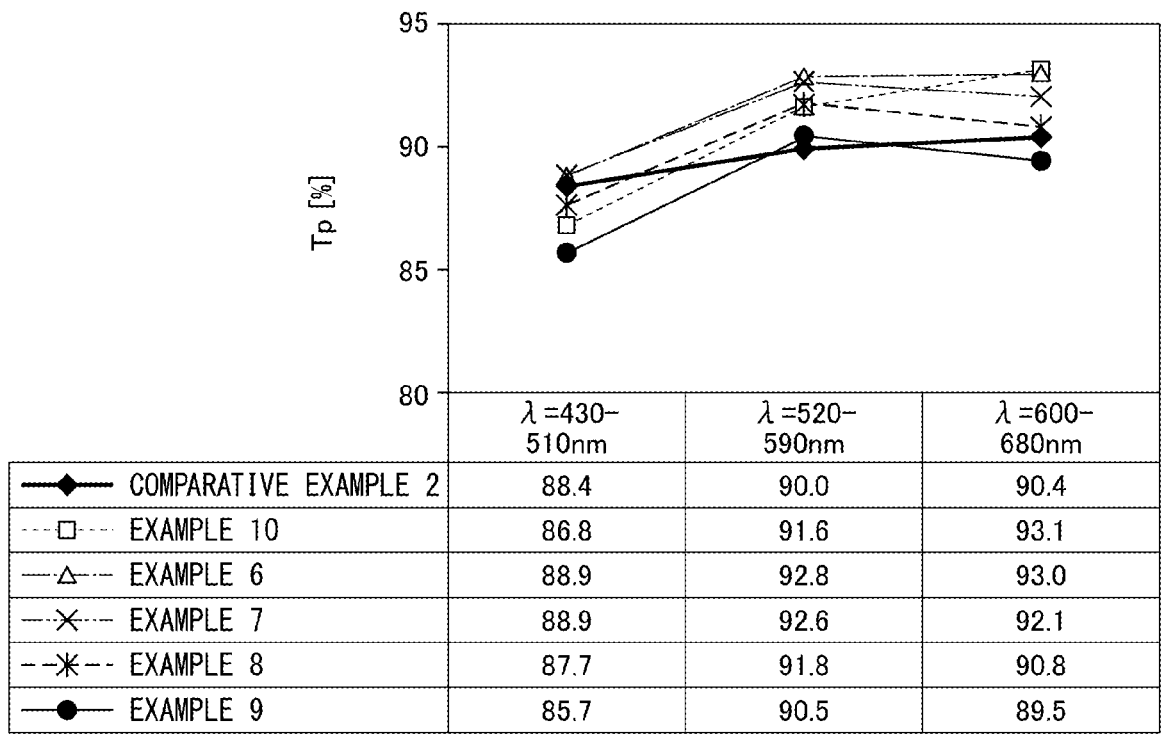
FIG. 8 is a diagram summarizing the transmission axis transmittances of Examples 6 to 10 and Comparative Example 2 for each wavelength.

FIG. 7 shows the transmission axis transmittances of Examples 6 to 10 and Comparative Example 2. FIG. 8 is a diagram summarizing the transmission axis transmittances of Examples 6 to 10 and Comparative Example 2 for each wavelength. In Examples 6 to 10, the transmission axis transmittances was improved as compared with Comparative Example 2 in the wavelength range of 520 nm or more and 600 nm or less, which has high visual sensitivity.

REFERENCE EXAMPLES

In the reference examples, antireflection layers were formed on both sides of the transparent substrate. The reference example does not have protrusions and does not show polarization characteristics. The structure of the antireflection layer on both sides in Reference Example 1 was the same as that of the second antireflection, layer 30 in Example 1. Reference Example 2 is different from Reference Example 1 in that the film thickness of the outermost layer is increased by 20 nm. Reference Example 3 is different from Reference Example 1 in that the film thickness of the outermost layer is increased by 40 nm. Reference Example 4 is different from Reference Example 1 in that the film thickness of the outermost layer is reduced by 20 nm. Reference Example 5 is different from Reference Example 1 in that the film thickness of the outermost layer is reduced by 40 nm.

Figure 9:
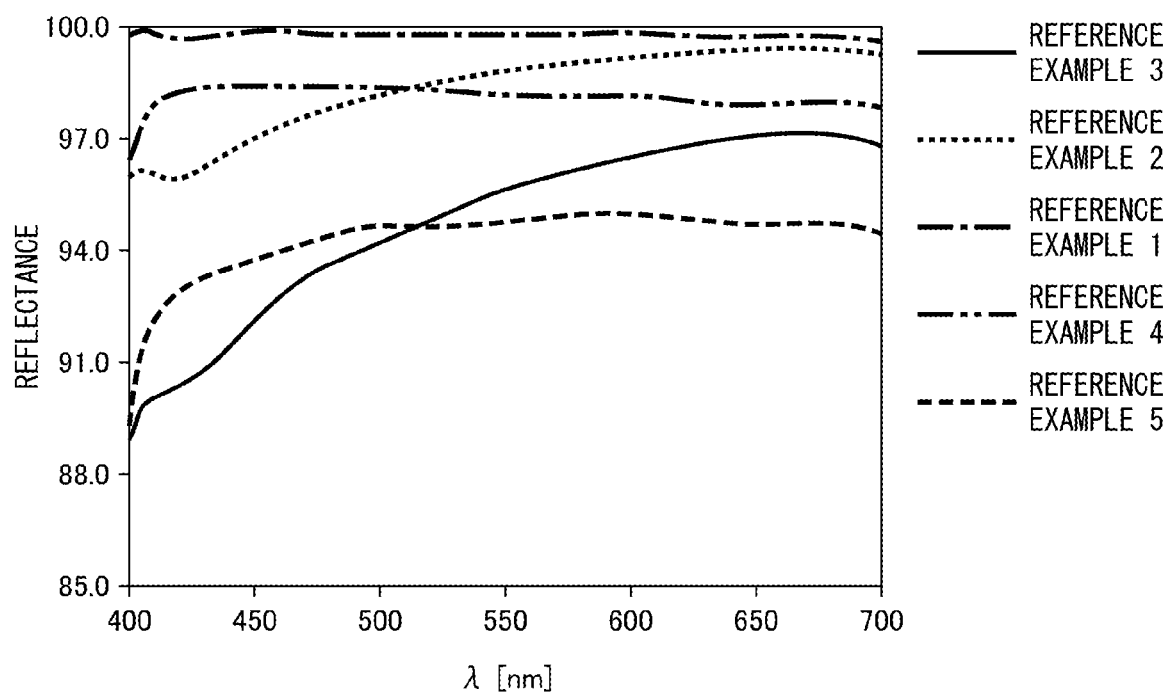
FIG. 9 shows the transmittance of the substrate according to the reference example.

FIG. 9 shows the transmittance of the substrate according to the reference example. As shown in FIG. 9, it is important to design the film thickness of each antireflection layer that prevents reflection by utilizing the interference of light. When the film thickness changes, the transmittance decreases significantly. On the other hand, in the above-mentioned Examples 1 to 4 and 6 to 9, although the designed layer thickness of the antireflection layer is changed by digging the outermost layer, the improvement in transmittance was an unexpected result.

REFERENCE SIGNS LIST 10 transparent substrate
10A first surface
10B second surface
20 first antireflection layer
21, 31, 51 low refractive index layer
22, 32, 52 high refractive index layer
30 second antireflection layer
40 protrusions
42 reflecting layer
44 dielectric layer
46 absorbing layer
100, 101 polarizing plate
R1 overlapped region
R2 non-overlapped region
R1a, R2a surface

The invention claimed is:

1. A polarizing plate having a wire grid structure comprising:
   a transparent substrate;
   a first antireflection layer laminated on a first surface of the transparent substrate;
   a plurality of protrusions protruding from the first antireflection layer;
   a second antireflection layer laminated on a second surface opposite to the first surface;
   wherein the plurality of protrusions are periodically arranged at a pitch shorter than a wavelength of light in a use band,
   each of the protrusions extends in in a first direction and includes a reflective layer, a dielectric layer, and an absorption layer in order from the first direction,
   both the first antireflection layer and the second antireflection layer have high refractive index layers and low refractive index layers that are alternately laminated, and
   a layer of the first antireflection layer farthest from the transparent substrate is an outermost layer, and a non-overlapped region that does not overlap with the plurality of protrusions of the outermost layer is recessed toward the transparent substrate from an overlapped region that overlaps the plurality of protrusions of the outermost layer.

2. The polarizing plate according to claim 1, wherein both the first antireflection layer and the second antireflection layer are composed of 5 or more and 10 or less layers.

3. The polarizing plate according to claim 1, wherein the high refractive index layers are composed of $TiO_2$ or $Nb_2O_5$, and the low refractive index layers are composed of $SiO_2$.

4. The polarizing plate according to claim 1, wherein the difference between the film thickness of the overlapped region that overlaps the plurality of protrusions of the first antireflection layer and the film thickness of the non-overlapped region that does not overlap the plurality of protrusions is 30 nm or less.

5. The polarizing plate according to claim 1, wherein the difference between the film thickness of the overlapped region that overlaps the plurality of protrusions of the first antireflection layer and the film thickness of the non-overlapped region that does not overlap the plurality of protrusions is 9% or less of the film thickness of the overlapped region.

6. The polarizing plate according to claim 1, wherein a film thickness difference with respect to the film thickness of the outermost layer in the overlapped region is 10% or more and 35% or less.

7. An optical apparatus comprising the polarizing plate according to claim 1.

8. A method of manufacturing a polarizing plate comprising:
- a step of laminating alternately high-refractive index layers and low-refractive index layers on both sides of a transparent substrate, and forming a first antireflection layer and a second antireflection layer on them,
- a step of laminating a reflective layer, a dielectric layer, and an absorbing layer in this order on the first antireflection layer to form a laminate,
- a step of processing the laminate to form a plurality of protrusions that are periodically arranged at a pitch shorter than the wavelength of light in use band, and
- a step of etching a non-overlapped region of the first antireflection layer that does not overlap with the plurality of protrusions through the plurality of protrusions,
- wherein a layer of the first antireflection layer farthest from the transparent substrate is an outermost layer, and a non-overlapped region that does not overlap with the plurality of protrusions of the outermost layer is recessed toward the transparent substrate from an overlapped region that overlaps the plurality of protrusions of the outermost layer.

* * * * *